US006409938B1

(12) United States Patent
Comanzo

(10) Patent No.: US 6,409,938 B1
(45) Date of Patent: Jun. 25, 2002

(54) ALUMINUM FLUORIDE FLUX SYNTHESIS METHOD FOR PRODUCING CERIUM DOPED YAG

(75) Inventor: Holly Ann Comanzo, Niskayuna, NY (US)

(73) Assignee: The General Electric Company, Schenectady, NY (US)

(*) Notice: Subject to any disclaimer, the term of this patent is extended or adjusted under 35 U.S.C. 154(b) by 0 days.

(21) Appl. No.: 09/534,576

(22) Filed: Mar. 27, 2000

(51) Int. Cl.[7] ............................................. C09K 11/08
(52) U.S. Cl. ................................................. 252/301.4 R
(58) Field of Search .................................. 252/301.4 R

(56) References Cited

U.S. PATENT DOCUMENTS

| | | | |
|---|---|---|---|
| 4,141,855 A | * 2/1979 | Tomiki et al. | ......... 252/301.4 R |
| 4,661,419 A | 4/1987 | Nakamura | .................. 428/691 |
| 5,198,679 A | 3/1993 | Katoh et al. | ............. 250/484.1 |
| 5,571,451 A | 11/1996 | Srivastava et al. | ........ 252/301.4 |
| 5,813,753 A | 9/1998 | Vriens et al. | ................ 362/293 |
| 5,847,507 A | 12/1998 | Butterworth et al. | ........ 313/512 |
| 5,851,063 A | 12/1998 | Doughty et al. | ............. 362/231 |
| 5,925,897 A | 7/1999 | Oberman | ...................... 257/80 |
| 5,966,393 A | 10/1999 | Hide et al. | ...................... 372/23 |
| 5,998,925 A | 12/1999 | Shimizu et al. | .............. 313/503 |
| 6,066,861 A | 5/2000 | Höhn et al. | .................... 257/99 |
| 6,069,440 A | 5/2000 | Shimizu et al. | .............. 313/486 |

OTHER PUBLICATIONS

Keith Butler: Flourescent Lamp Phosphors, pp. 98–107 (The Pennsylvania State University Press 1980), No Month.
S. Nakamura et al.: The Blue Laser Diode, pp. 216–221, 328–329 (Springer 1997), No Month.
G. Blasse et al.: Luminescent Materials, pp. 109–110 (Springer–Verlag 1994), No Month.

* cited by examiner

Primary Examiner—C. Melissa Koslow
(74) Attorney, Agent, or Firm—Foley & Lardner

(57) ABSTRACT

A method of making a YAG:$Ce^{3+}$ phosphor includes adding an $AlF_3$ fluxing agent to a yttrium, cerium, aluminum and oxygen containing starting powder and sintering the powder in a weak reducing atmosphere generated by evaporating charcoal. The resulting phosphor has a luminosity of greater than 435 lumens per watt.

43 Claims, 4 Drawing Sheets

ALUMINUM FLUORIDE FLUX SYNTHESIS METHOD FOR PRODUCING CERIUM DOPED YAG

BACKGROUND OF THE INVENTION

This invention relates generally to a ceramic phosphor manufacturing method, and specifically to a YAG:Ce$^{3+}$ phosphor made by using aluminum fluoride as a fluxing agent in the garnet synthesis.

White light emitting LEDs are used as a backlight in liquid crystal displays and as a replacement for small conventional and fluorescent lamps. As discussed in chapter 10.4 of "The Blue Laser Diode" by S. Nakamura et al., pages 216–221 Springer 1997), incorporated herein by reference, white light LEDs are fabricated by forming a ceramic phosphor layer on the output surface of a blue emitting semiconductor LED. Conventionally, the blue LED is an InGaN single quantum well LED and the phosphor is a trivalent cerium doped yttrium aluminum garnet ($Y_3Al_5O_{12}$:Ce$^{3+}$ or "YAG:Ce$^{3+}$"). A portion of the blue light emitted by the LED excites the phosphor causing it to emit yellow light. Another portion of the blue light emitted by the LED is transmitted through the phosphor and is mixed with the yellow light emitted by the phosphor. The viewer perceives the mixture of blue and yellow light as a white light.

However, the prior art YAG:Ce$^{3+}$ phosphor suffers from several disadvantages. First, the quantum efficiency and luminosity of the prior art YAG:Ce$^{3+}$ phosphor is lower than desired for optimum luminescent characteristics. Second, the prior art YAG:Ce$^{3+}$ phosphor synthesis process requires maintaining a strong reducing atmosphere or ambient, such as a forming gas (98% $N_2$, 2% $H_2$) atmosphere, during the sintering (i.e., crystallization) step in order to obtain a sufficient crystallization of the phosphor. The requirement for a strong reducing atmosphere during sintering lowers the quantum efficiency of the phosphor, complicates the sintering process and increases the cost of the phosphor.

BRIEF SUMMARY OF THE INVENTION

In accordance with one aspect of the present invention, there is provided a phosphor comprising $A_3 D_5 E_{12}$: Ce$^{3+}$, where A comprises at least one of Y, Gd, Lu, Sm and La; D comprises at least one of Al, Ga, Sc and In; E comprises oxygen and the phosphor luminosity is greater than 435 lumens per watt. Furthermore, E may also comprise fluorine from an AlF$_3$ flux.

In accordance with another aspect of the present invention, there is provided a method of making a phosphor, comprising combining at least one powder comprising yttrium, cerium, aluminum and oxygen with AlF$_3$ to obtain a first mixture, and heating the first mixture to form a solid phosphor body.

In accordance with another aspect of the present invention, there is provided a combination of powders, comprising at least one powder comprising Y, Ce, Al and oxygen in combination with an AlF$_3$ powder.

DETAILED DESCRIPTION OF THE INVENTION

Figure 1:
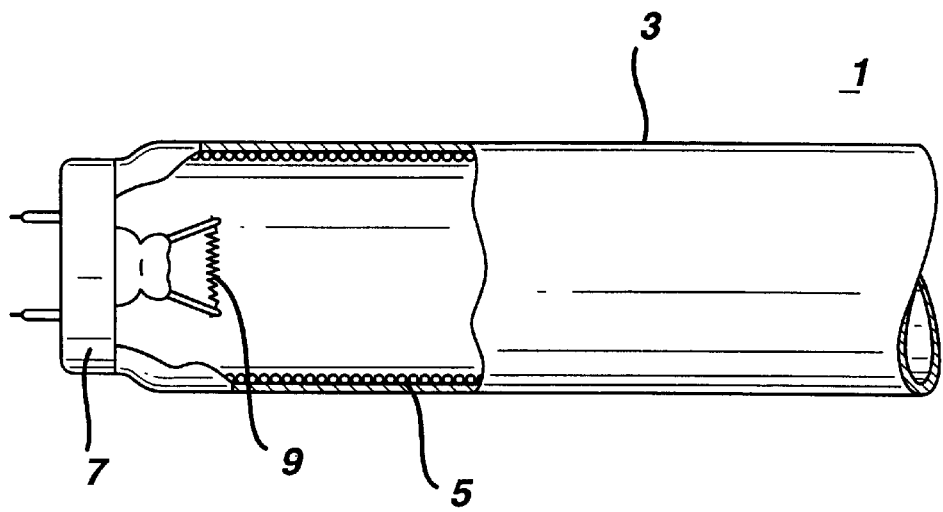
FIG. 1 is a cross-sectional view of a fluorescent lamp according to one preferred aspect of the present invention.

In view of the problems in the prior art, it is desirable to obtain a YAG:Ce$^{3+}$ phosphor with an improved quantum efficiency and luminosity. It is also desirable to manufacture the YAG:Ce$^{3+}$ phosphor without using a strong reducing atmosphere in order to simplify the manufacturing process and increase the quantum efficiency of the phosphor. The present inventor has discovered that the phosphor quantum efficiency and luminosity may be unexpectedly improved and the use of a strong reducing atmosphere may be avoided if aluminum fluoride (AlF$_3$) is used as a fluxing agent (i.e., as a flux) in the synthesis of YAG:Ce$^{3+}$ family of phosphors.

The term "YAG:Ce$^{3+}$ family of phosphors" refers to a phosphor comprising $A_3 D_5 E_{12}$:Ce$^{3+}$, where A comprises at least one of Y, Gd, Lu, Sm and La; D comprises at least one of Al, Ga, Sc and In; and E comprises oxygen and optionally fluorine. In the above phosphor, the trivalent Ce ions act as the activator ions, and are responsible for the emission of yellow light from the phosphor. The Y, Al and O ions preferably comprise the crystal lattice of the phosphor and other ions, such as Gd and Ga ions, may be added to change the color output of the phosphor. However, the Y and Al ions may be substituted in whole or in part by the other ions, such as Gd and Ga ions, respectively. Furthermore, the phosphor may contain other elements in addition to $A_3 D_5 E_{12}$:Ce$^{3+}$. For example, the phosphor may also contain a small amount of fluorine as a residue of the AlF$_3$ flux. Preferably, the phosphor comprises $(Y_{1-x-z}Ce_xGd_z)_3Al_5O_{12}$, where $0.1>x>0$ and $0.7>z\geq0$, such as $(Y_{0.97}Ce_{0.03})_3Al_5O_{12}$ or $(Y_{0.37}Gd_{0.6}Ce_{0.03})_3Al_5O_{12}$. The phosphor may also be written as $(Y_{1-x-z}Ce_xGd_z)_3Al_5(O,F)_{12}$ to account for fluorine incorporation.

The improved phosphor may be made, for example, by any ceramic powder method that utilizes the AlF$_3$ flux. Preferably, the method of making the phosphor comprises the following steps. First, the starting compounds of the phosphor material are mixed. For example, the compounds may be manually blended in a mortar or another suitable container, or mechanically blended using a suitable device such as a ball mill, to form a first composite powder mixture.

For example, the preferred starting phosphor compounds comprise stoichiometric amounts of yttrium oxide, $Y_2O_3$, cerium oxide, CeO$_2$, and alumina, $Al_2O_3$. Preferably, the AlF$_3$ flux is added at a concentration of 2–20 mole percent per mole of the phosphor produced. If desired, gadolinium oxide powder, $Gd_2O_3$, or other starting compounds may also be added to the first composite powder mixture. Alternatively, other compounds, such as hydroxide, oxalate, carbonate and/or nitrate starting phosphor compounds may be used instead of or with the oxide compounds.

Alternatively, Y and Ce, and optionally other rare earth elements, such as Gd, may be first dissolved in an acid. The dissolved elements may then be co-precipitated with oxalic acid to form a powder comprising Y, Ce, O and any other optional rare earth element. For example, the precipitated powder may comprise $(Y_{0.97}Ce_{0.03})_2(C_2O_4)_3 \cdot xH_2O$ which is then decomposed by annealing at a suitable temperature, such as 1000° C., to form a $(Y_{0.97}Ce_{0.03})_2O_3$. This powder is then mixed with an powder comprising aluminum and oxygen, such as $Al_2O_3$ powder, and an AlF$_3$ powder to form a first composite powder mixture. If desired, other starting compounds may also be added to the first composite powder mixture. Furthermore, other combinations of starting materials may also be used, if desired. For example, hydroxides of the starting materials may be precipitated and then decomposed to form oxides of the starting materials, which are then mixed with $AlF_3$ to form the blended first powder.

The blended first powder is then fired or sintered in a suitable container for between about 2 and 10 hours at 1000 to 1600° C., preferably for six hours at 1500° C., to form a sintered body or cake. Preferably, the container is an alumina crucible. In a preferred aspect of the present invention, the alumina crucible is placed into a second container, such as a large crucible or other container, which contains a carbon based fuel, such as activated charcoal. Both containers are then individually covered and placed in a furnace or adjacent to any other suitable heat source and their temperature is raised to 1000 to 1600° C. to evaporate at least a portion of the fuel to produce a weak reducing atmosphere comprising carbon, such as a carbon dioxide and/or a carbon monoxide atmosphere. The reducing atmosphere penetrates the first crucible, even if covered, to enhance the reduction process. The amount of charcoal is not critical, and may comprise from 1/10 to 1/2 of the volume of the second container.

The order of steps described above may be changed as desired. For example, the powders may be placed into the first container, the charcoal may be added to the second container and then the first container may be placed into the second container. Alternatively, the powders may be added into the first container after it is placed into the second container. Likewise, the charcoal may be added to the second container after the first container is placed into the second container. Furthermore, as described above, the smaller first container is placed into a larger second container. However, the second container containing the charcoal may be placed inside the larger first container or adjacent to the first container, if desired.

The addition of aluminum fluoride flux to the starting materials allows use of a weak, carbon containing reducing atmosphere during sintering instead of a strong, hydrogen containing reducing atmosphere, such as forming gas (comprising $H_2$ and $N_2$) and/or other hydrogen containing gas. Sintering without forming gas enhances the luminosity of the phosphor and simplifies the sintering process because a separate forming gas source and delivery means, such as valves and pipes are not required. However, if desired, the reducing atmosphere may comprise forming gas or a combination of forming gas and a carbon containing gas, such as carbon dioxide and/or carbon monoxide. Furthermore, if desired, charcoal may be replaced as the source of the carbon containing atmosphere with other carbon containing fuels or with a carbon monoxide and/or carbon dioxide gas source, such as a gas cylinder and gas delivery pipes.

The solid sintered phosphor body may be converted to a phosphor powder in order to easily coat the phosphor powder on a portion of an illumination system. The solid phosphor body may be converted to a phosphor powder by any crushing, milling or pulverizing method, such as wet milling, dry milling, jet milling or crushing. Preferably, the solid body is wet milled in water until it has a median particle size of 6–10 microns, and subsequently dried. However, other milling media, such as propanol or methanol, for example, may be used instead. The phosphor powder may also be sieved, for example to 400 mesh, to achieve a desired PSD.

The phosphor powder may then be placed into an illumination system, such as a white light emitting diode system, a fluorescent lamp or any other system where a YAG:$Ce^{3+}$ phosphor is desirable. Preferably, a suspension of the phosphor powder and a liquid is used to coat the phosphor powder onto a portion of the illumination system. The suspension may also optionally contain a binder in a solvent. Preferably, the binder comprises an organic material, such as nitrocellulose, in a solvent such as butyl acetate, amyl acetate, methyl propanol or propylene glycol mono-methyl ether acetate at a 90–95% level with 1–2% denatured ethanol. The binder enhances the adhesion of the powder particles to each other and to the illumination system portion. However, the binder may be omitted to simplify processing, if desired. After coating, the suspension is dried and may be heated to evaporate the binder. However, other methods of placing the phosphor into the illumination system may be used, if desired.

For example, the phosphor powder may be placed onto a portion of a fluorescent lamp 1, as illustrated in FIG. 1. The phosphor powder suspension is coated onto a surface of the lamp cover 3, preferably the inner surface, and allowed to dry to evaporate the solvent to form a phosphor coating 5. Any coating method, such as dip coating or spray coating, may be used to coat the suspension. The fluorescent lamp also preferably contains a lamp base 7 and a cathode 9.

In another aspect of the present invention, the phosphor powder may be placed onto a portion of a plasma display device. A portion of the phosphor powder selectively irradiated by a plasma discharge emits yellow light which appears white when mixed with blue light emitted by the discharge or another source.

According to a preferred aspect of the present invention, the phosphor powder is placed into a white light illumination system. The white light illumination system according to the preferred aspect of the present invention may have various different structures.

Figure 2:
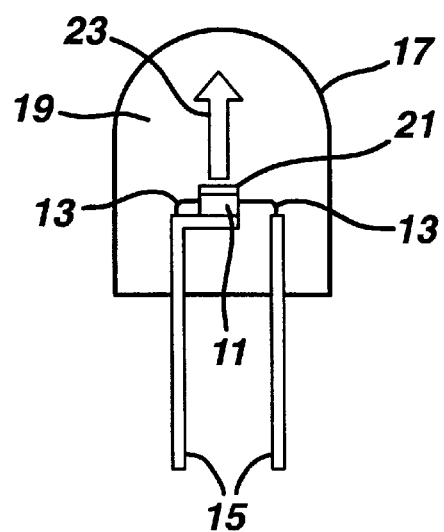
FIGS. 2–4 are schematic cross-sectional views of a white light illumination system according to another aspect of the present invention.

The first preferred structure is schematically illustrated in FIG. 2. The illumination system includes a light emitting diode ("LED") chip 11 and leads 13 electrically attached to the LED chip. The leads 13 may comprise thin wires supported by a thicker lead frame(s) 15 or the leads may comprise self supported electrodes and the lead frame may be omitted. The leads 13 provide current to the LED chip 11 and thus cause the LED chip 11 to emit radiation.

The LED may comprise any LED which is capable of producing white light when its emitted radiation is directed onto the phosphor. Thus, the LED may comprise a semiconductor diode based on any suitable III–V, II–VI or IV–IV semiconductor layers and having an emission wavelength of 400 to 500 nm. Preferably, the LED may contain at least one semiconductor layer comprising GaN, ZnSe or SiC. For example, the LED may comprise an InGaN p-n junction having an emission wavelength greater than 470 nm but less than 500 nm and the phosphor may comprise $(Y_{1-x-z}Ce_xGd_z)_3Al_5O_{12}$, where $0.1>x>0$ and $0.7>z>0.4$ in order to decrease the system's sensitivity to manufacturing errors in phosphor thickness and thus to increase the manufacturing yield of the system. A system with an LED emission wavelength of 478 nm, x=0.03 and z=0.6 is preferred. However, Gd may be omitted or added in a reduced amount (i.e., $z \leq 0.05$) in order to improve the luminosity and quantum efficiency of the phosphor.

The LED chip 11 is encapsulated within a shell 17 which encloses the LED chip and an encapsulant material 19. The shell 17 may be, for example, glass or plastic. The encapsulant material may be, for example, an epoxy or a polymer material, such as silicone. The LED chip 11 may be supported, for example, by the lead frame 15, by the self supporting electrodes, the bottom of the shell 17 or by a pedestal mounted to the shell or to the lead frame.

The first preferred structure of the illumination system includes a phosphor layer 21. The phosphor may be coated over or directly on the light emitting surface of the LED chip 11 by coating and drying the phosphor suspension over the LED chip 11. Both the shell 17 and the encapsulant 19 should be transparent to allow white light 23 to be transmitted through those elements.

Figure 3:
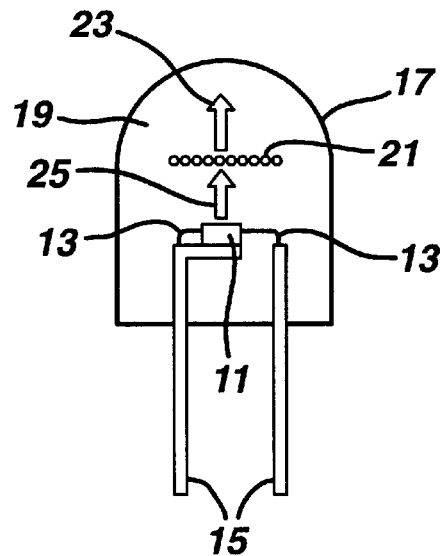

FIG. 3 illustrates a second preferred structure of the system according to the preferred aspect of the present invention. The structure of FIG. 3 is the same as that of FIG. 2, except that the phosphor 21 is interspersed within the encapsulant material 19, instead of being formed over the LED chip 11. The phosphor powder may be interspersed within a single region of the encapsulant material 19 or throughout the entire volume of the encapsulant material. The blue or blue-green light 25 emitted by the LED chip 11 mixes with the yellow light emitted by the phosphor 21, and the mixed light appears as white light 23. If the phosphor is to be interspersed within the encapsulant material, then the phosphor powder may be added to a polymer precursor, and then the polymer precursor may be cured to solidify the polymer material. Alternatively, the phosphor powder may be mixed in with the epoxy encapsulant. Other phosphor interspersion methods may also be used.

Figure 4:
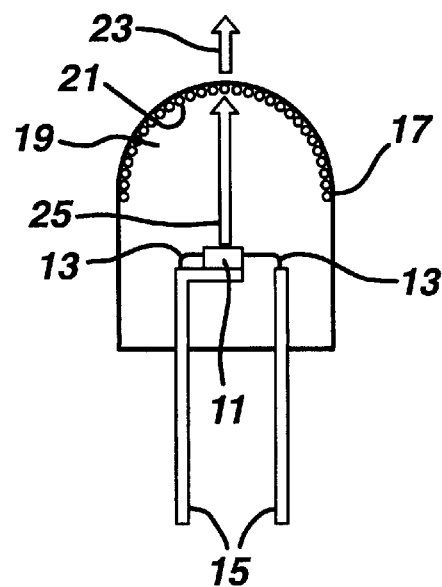

FIG. 4 illustrates a third preferred structure of the system according to the preferred aspects of the present invention. The structure of FIG. 4 is the same as that of FIG. 2, except that the phosphor 21 is coated on the shell 17, instead of being formed over the LED chip 11. The phosphor is preferably coated on the inside surface of the shell 17, although the phosphor may be coated on the outside surface of the shell, if desired. The phosphor 21 may be coated on the entire surface of the shell or only a top portion of the surface of the shell. The blue or blue-green light 25 emitted by the LED chip 11 mixes with the yellow light emitted by the phosphor 21, and the mixed light appears as white light 23.

Of course, the embodiments of FIGS. 2–4 may be combined and the phosphor may be located in any two or all three locations or in any other suitable location, such as separately from the shell or integrated into the LED.

The following example is merely illustrative, and should not be construed to be any sort of limitation on the scope of the claimed invention.

EXAMPLE 1

100 grams of the $(Y_{0.97}Ce_{0.03})_3Al_5O_{12}$ phosphor was fabricated by the following method. First, the starting powders (i.e., raw materials) comprising 54.92 grams of $Y_2O_3$, 2.59 grams of $CeO_2$, 41.76 grams of $Al_2O_3$, and 1.4 grams of $AlF_3$ flux were mixed together and placed in a covered first alumina crucible. The 41.76 grams of $Al_2O_3$ takes into account the incorporation of Al from $AlF_3$ into the phosphor, and is slightly less than would be required to obtain a stoichiometric phosphor without the $AlF_3$ flux. Furthermore, a small amount of fluorine from the flux may have been incorporated into the phosphor lattice on the oxygen lattice site.

The first crucible was then placed into a larger second alumina crucible. The first crucible was then surrounded with activated charcoal and the both crucibles were covered with an alumina lid. The double crucible was heated to a temperature of 1500° C. for 6 hours to sinter or fire the starting powders. The reducing portion of the atmosphere used to convert $Ce^{4+}$ to $Ce^{3+}$ was generated by the activated charcoal.

On the completion of the heating, the starting powders solidified into a solid phosphor body or cake. The cake was reduced to a phosphor powder by ball milling the cake in water until the mean particle size of the powder reached 6 microns.

The luminescent properties of the phosphor powder were determined by the following methods. The phosphor powder was packed, mounted on a substrate and irradiated with incident radiation (i.e., blue light or UV radiation). The radiation emitted by the phosphor powder was measured by a spectrophotometer.

Figure 5:
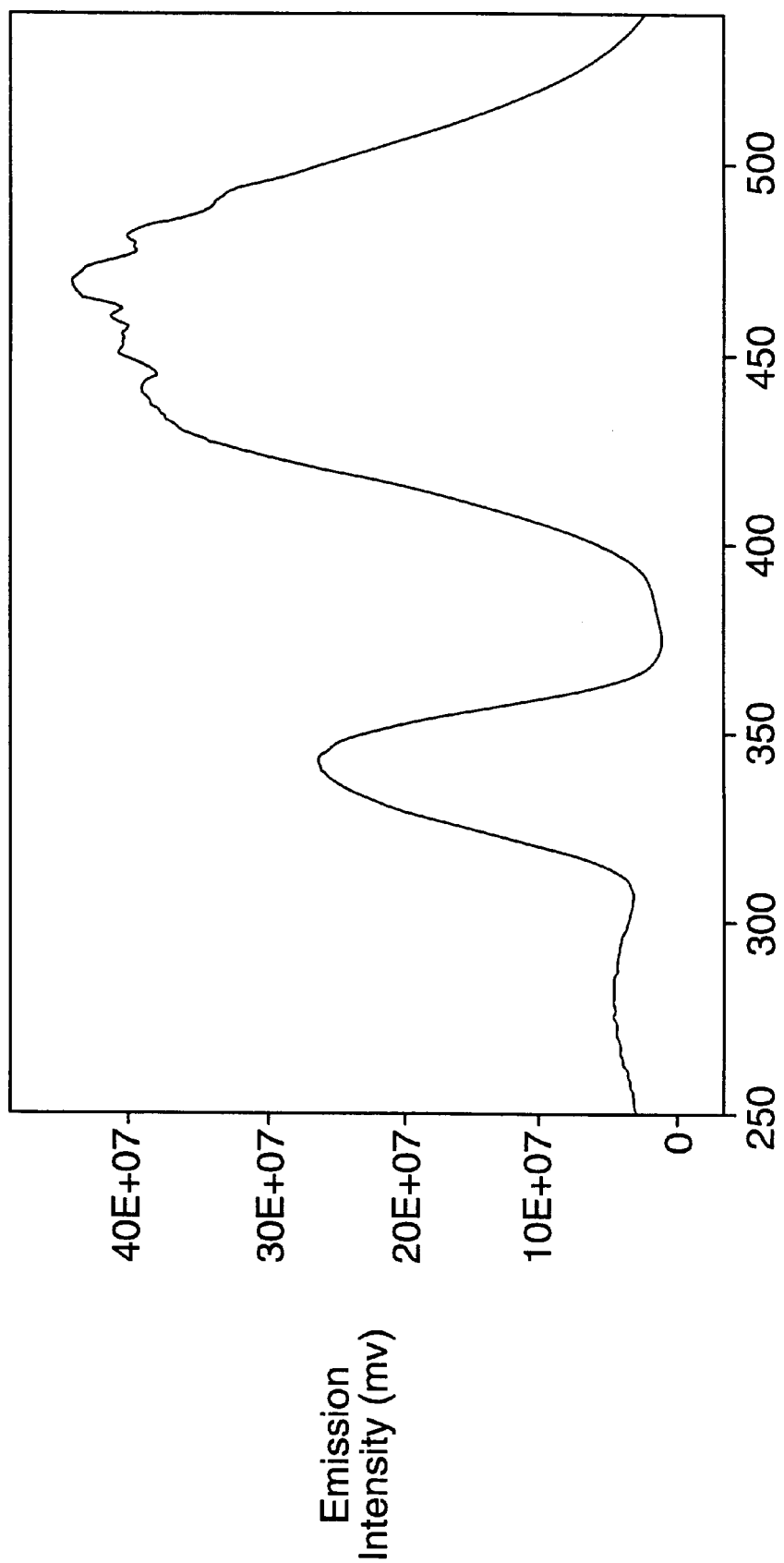
FIG. 5 is a plot of the excitation spectra of a phosphor according to the specific example of the present invention.

The excitation spectra of the phosphor were determined by setting the spectrophotometer to detect phosphor emission at 580 nm and varying the incident radiation wavelength from 250 nm to 550 nm. The excitation spectra of the phosphor is illustrated in FIG. 5. As shown in FIG. 5, the phosphor emits yellow light at 580 nm in response to irradiation by 310–360 nm UV and 400–500 nm blue incident radiation. Thus, the phosphor efficiently converts UV and especially blue incident radiation to yellow light.

Figure 6:
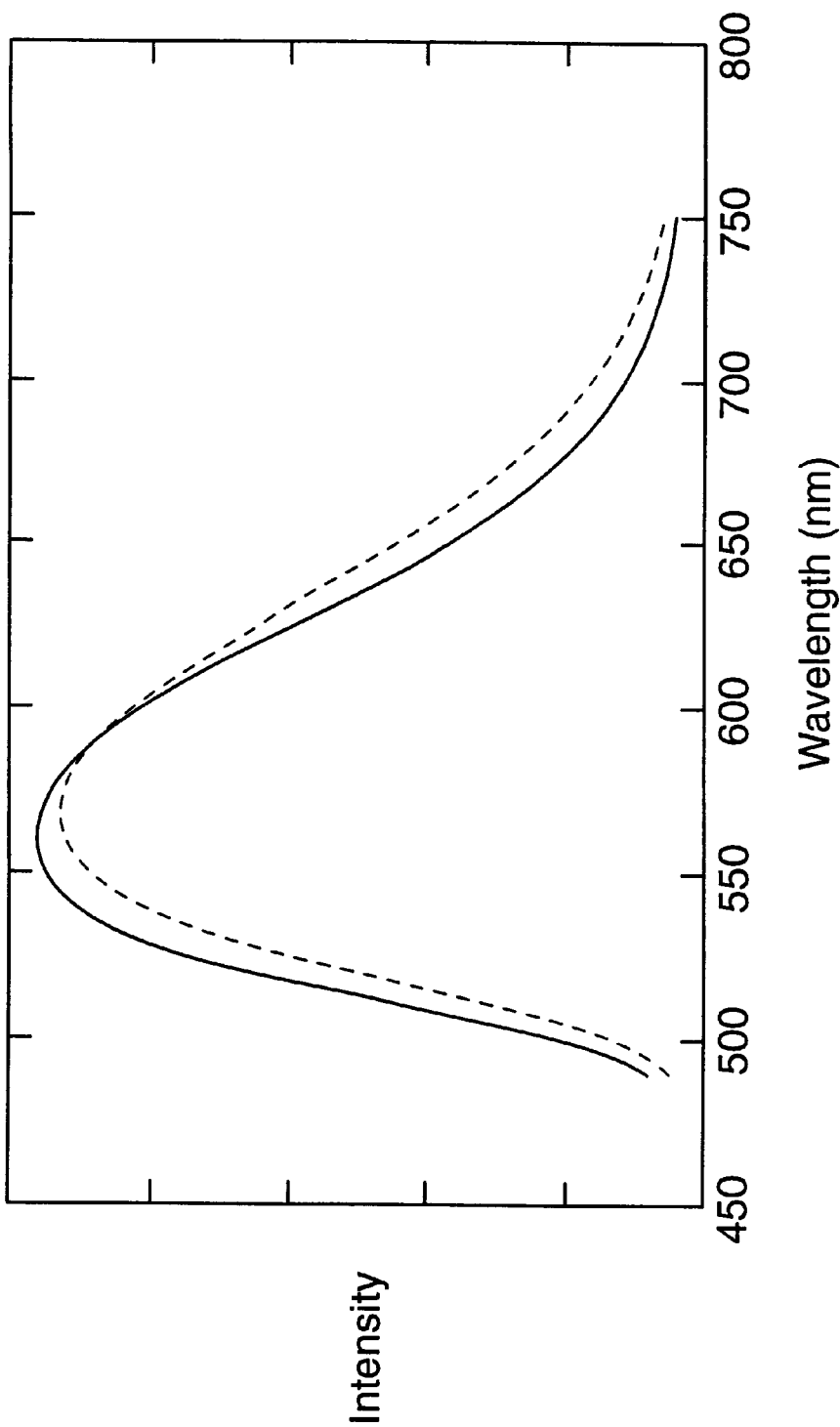
FIG. 6 is a plot comparing the emission spectra of a phosphor according to the specific example of the present invention to the emission spectra of a phosphor according to the comparative example.

The emission (i.e., photoluminescence) spectra of the phosphor was determined by irradiating the phosphor with incident blue light having a constant wavelength of 450 nm. The radiation emitted by the phosphor powder was measured by a spectrophotometer for wavelengths ranging from 490 to 750 nm. The emission spectra of the phosphor is illustrated in FIG. 6, and is discussed in more detail below.

Comparative Example 2

100 grams of the prior art $(Y_{0.97}Ce_{0.03})_3Al_5O_{12}$ phosphor was fabricated using $YF_3$ as a flux instead of $AlF_3$. $Al(OH)_3$, $Y_2O_3$, $CeO_2$ and $YF_3$ were dry blended and fired at 1530° C. in 60% $H_2/N_2$ forming gas atmosphere to form a sintered cake. The cake was broken down into a powder by a jaw crusher and the powder was sieved to 400 mesh to achieve the desired PSD.

Experimental Results

The quantum efficiency, luminosity and color coordinate values of the phosphors according to Example 1 and to Comparative Example 2 are shown in Table 1, below.

TABLE 1

| Sample | QE | Luminosity (lumen/Watt) | x color coordinate | y color coordinate |
| --- | --- | --- | --- | --- |
| Example 1 ($AlF_3$ flux) | 1 | 453 | 0.435 | 0.545 |
| Comparative Example 2 ($YF_3$ flux) | 0.909 | 431 | 0.455 | 0.530 |

Phosphor quantum efficiency (QE) is defined by the ratio of emitted photons to absorbed photons, according to the following formula:

$QE$=[(emitted radiation intensity of the phosphor)/absorption of the phosphor)]*[(absorption of a standard reference)/(emitted radiation intensity of the standard reference)].

Comparative example 2 was used as the standard reference. The values of QE are presented in relative arbitrary units. The term color coordinates refers to the x and y coordinates on the well known CIE chromaticity diagram, described in detail on pages 98–107 of K. H. Butler, "Fluorescent Lamp Phosphors" (The Pennsylvania State University Press 1980) and pages 109–110 of G. Blasse et al., "Luminescent Materials" (Springer-Verlag 1994), both incorporated herein by reference.

As shown in Table 1, using the $AlF_3$ flux according to Example 1 instead the prior art $YF_3$ flux according to Comparative Example 2 unexpectedly results in over a 9% increase in the phosphor quantum efficiency. Furthermore, the use of the $AlF_3$ resulted in a phosphor having a luminosity of 453 lm/W, which is unexpectedly over 5% better than the 431 lm/W luminosity of the prior art phosphor. Thus, the use of $AlF_3$ results in a phosphor with a luminescence above 435 lm/W. Therefore, a luminescence range of greater than 435 lm/W and less than or equal to 453 lm/W may be obtained by using the $AlF_3$ flux.

Furthermore, the color coordinates of the phosphor made with the $AlF_3$ flux are shifted toward the green spectral region compared to the color coordinates of the prior art phosphor made with $YF_3$ flux. The emission spectra of both phosphors is shown in FIG. 6. The spectra of the phosphor of Example 1 is shown as a solid line, while the spectra of the phosphor of Comparative Example 2 is shown as a dashed line. The peak emission wavelength of the phosphor of Example 1 is shifted toward the shorter (i.e., green) wavelength compared to the peak emission of Comparative Example 2. The shift toward the green spectral region is advantageous because it improves the luminosity of the phosphor.

The quantum efficiency, luminosity and color coordinates of the phosphor of Example 1 were further compared to those of commercially available prior art YAG:$Ce^{3+}$ phosphors. The name of the phosphor manufacturer of each phosphor is listed in Table 2, below. While the exact method of manufacturing of the prior art phosphors was not disclosed by their manufacturers, the present inventor believes that $AlF_3$ was not used as a flux during the manufacturing of these samples.

TABLE 2

| YAG:$Ce^{3+}$ phosphor | QE | Luminosity (lm/W) | x color coordinate | y color coordinate |
|---|---|---|---|---|
| Example 1 (GE) | 1.00 | 453 | 0.435 | 0.545 |
| Comparative Example 2 (GE) | 0.909 | 431 | 0.455 | 0.530 |
| Osram | 0.96 | 429 | 0.455 | 0.529 |
| Kyokko | 0.90 | 400 | 0.478 | 0.511 |
| Philips | 0.90 | 435 | 0.449 | 0.534 |
| Toshiba | 0.90 | 379 | 0.494 | 0.498 |

As shown in Table 2, the phosphor of Example 1 has a 4 to 10% higher quantum efficiency and 4% to 20% higher luminosity than the commercially available YAG:$Ce^{3+}$ phosphors. The present inventor believes that this unexpected result is due to the use of $AlF_3$ flux and/or the weak reducing atmosphere during the synthesis of the phosphor of Example 1. Therefore, a phosphor according to the preferred embodiment of the present invention contains a luminosity of greater than 435 lm/W, preferably 441 to 453 lm/W, most preferably between 447 and 453 lm/W.

EXAMPLES 3–8

To illustrate the effect of Gd content in the phosphor on luminosity and color coordinates, the phosphor of Example 1 was compared to Gd containing phosphors, as illustrated in Table 3. The phosphor fabrication process in Examples 3–8 was the same as in example 1, except that a portion of Y in the phosphor was substituted with Gd, as shown below.

TABLE 3

| Percent Gd (z) | Luminosity (lm/W) | x color coordinate | y color coordinate |
|---|---|---|---|
| 0 (Ex. 1) | 453 | 0.435 | 0.545 |
| 0.05 (Ex. 3) | 441 | 0.446 | 0.537 |
| 0.10 (Ex. 4) | 432 | 0.453 | 0.531 |
| 0.20 (Ex. 5) | 414 | 0.469 | 0.518 |
| 0.25 (Ex. 6) | 407 | 0.472 | 0.516 |
| 0.40 (Ex. 7) | 388 | 0.486 | 0.504 |
| 0.50 (Ex. 8) | 379 | 0.494 | 0.498 |

As illustrated in Table 3, in order to maintain the luminosity of the phosphor above 435 lm/W, the Gd should be omitted or its content in the phosphor should be maintained at about $z \leq 0.05$. In other words, the phosphor composition comprises $(Y_{1-x-z}Ce_xGd_z)_3Al_5O_{12}$, where $0.1 > x > 0$ and $0.05 \geq z \geq 0$.

Furthermore, as illustrated in Tables 1, 2 and 3, the phosphor made with the $AlF_3$ flux exhibits color coordinates which are shifted toward the green spectra region for low Gd content values of $z \leq 0.05$. For example, a phosphor with an "x" color coordinate range of 0.435 to 0.446 and a "y" color coordinate range of 0.537 to 0.545 may be achieved. The preferred color coordinates are x=0.435 and y=0.545. In contrast, the closest x and y color coordinates to the green spectral range that may be achieved by the prior art phosphors are x=0.449 and y=0.534, as illustrated in Table 2.

However, if the optimum phosphor luminosity and color coordinates are not desired, then the Gd content may be maintained in a range of $0.7 > z > 0.05$ in order to decrease the system's sensitivity to manufacturing errors in phosphor thickness and thus to increase the manufacturing yield of the system.

The preferred embodiments have been set forth herein for the purpose of illustration. However, this description should not be deemed to be a limitation on the scope of the invention. Accordingly, various modifications, adaptations, and alternatives may occur to one skilled in the art without departing from the spirit and scope of the claimed inventive concept.

What is claimed is:
1. A phosphor comprising:

$A_3D_5E_{12}$:$Ce^{3+}$, wherein
A comprises at least one of Y, Gd, Lu, Sm and La;
D comprises at least one of Al, Ga, Sc and In;
E comprises oxygen;
Y, Al and oxygen comprise a crystal lattice of the phosphor; and the phosphor luminosity is greater than 435 lumens per watt.

2. The phosphor of claim 1, wherein:
the phosphor luminosity is 435 to 453 lumens per watt;
the phosphor x color coordinate ranges from 0.435 to 0.446; and
the phosphor y color coordinate ranges from 0.537 to 0.545.

3. The phosphor of claim 2, comprising:
$(Y_{1-x-z}Ce_xGd_z)_3Al_5O_{12}$, wherein $0.1 > x > 0$ and $0.05 > z \geq 0$.

4. The phosphor of claim 3, comprising:
$(Y_{0.97}Ce_{0.03})_3Al_5O_{12}$, wherein:
the phosphor luminosity is 453 lumens per watt;
the phosphor x color coordinate is 0.435; and
the phosphor y color coordinate is 0.545.

5. The phosphor of claim 3, comprising $(Y_{0.93}Gd_{0.05}Ce_{0.03})_3Al_5O_{12}$, wherein:
the phosphor luminosity is 441 lumens per watt;
the phosphor x color coordinate is 0.446; and
the phosphor y color coordinate is 0.537.

6. The phosphor of claim 3, wherein at least a portion of the oxygen is substituted by fluorine from an $AlF_3$ flux.

7. A white light illumination system comprising a light emitting diode and the phosphor of claim 1.

8. The system of claim 7 wherein the light emitting diode contains at least one semiconductor layer comprising GaN, ZnSe or SiC having an emission wavelength greater than 400 nm but less than 500 nm.

9. The system of claim 7, further comprising a shell containing the light emitting diode and an encapsulating material between the shell and the light emitting diode, and wherein:
a) the phosphor is coated over a surface of the light emitting diode;
b) the phosphor is interspersed in the encapsulating material; or
c) the phosphor is coated onto the shell.

10. A method of making a $YAG:Ce^{3+}$ phosphor, comprising:
combining at least one powder comprising yttrium, cerium, aluminum and oxygen with $AlF_3$ to obtain a first mixture; and
heating the first mixture to form a solid $YAG:Ce^{3+}$ phosphor body, wherein the phosphor luminosity is greater than 435 lumens per watt.

11. The method of claim 10, wherein the $YAG:Ce^{3+}$ phosphor comprises:

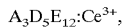

$A_3D_5E_{12}:Ce^{3+}$, wherein
A comprises at least one of Y, Gd, Lu, Sm and La;
D comprises at least one of Al, Ga, Sc and In;
E comprises oxygen; and
Y, Al and oxygen comprise a crystal lattice of the phosphor.

12. The method of claim 11, wherein the phosphor comprises:
$(Y_{1-x-z}Ce_xGd_z)_3Al_5O_{12}$, wherein $0.1>x>0$ and $0.7>z\geq0$; and
further comprising fluorine incorporated from the $AlF_3$.

13. The method of claim 11, wherein:
the at least one powder comprises a first powder comprising yttrium and oxygen, a second powder comprising cerium and oxygen, and a third powder comprising aluminum and oxygen; and
$AlF_3$ comprises a fourth powder.

14. The method of claim 13, wherein:
the first powder comprises $Y_2O_3$;
the second powder comprises $CeO_2$; and
the third powder comprises $Al_2O_3$.

15. The method of claim 13, wherein the at least one powder further comprises a $Gd_2O_3$ powder.

16. The method of claim 13, wherein at least one of the first powder, the second powder and the third powder comprises an oxalate, hydroxide, carbonate or nitrate compound.

17. The method of claim 11, wherein the concentration of the fourth powder comprises between 2 and 20 mole percent per mole of the phosphor produced.

18. The method of claim 11, wherein the step of combining at least one powder comprises:
dissolving Y and Ce in an acid;
co-precipitating a first powder comprising Y, Ce and oxygen with oxalic acid; and
combining the first powder with an $Al_2O_3$ powder and an $AlF_3$ powder.

19. The method of claim 18, further comprising:
dissolving Gd in the acid; and
wherein the first powder further comprises Gd.

20. The method of claim 10, wherein the step of heating comprises sintering in a reducing atmosphere comprising carbon.

21. The method of claim 20, wherein the reducing atmosphere does not contain forming gas.

22. The method of claim 20, wherein the step of sintering comprises:
placing the first mixture into a first container; and
evaporating a carbon based fuel to obtain the reducing atmosphere comprising at least one of carbon monoxide and carbon dioxide.

23. The method of claim 22, further comprising:
placing the carbon based fuel into a second container, wherein the carbon based fuel comprises activated charcoal;
placing the first container comprising a covered alumina crucible into the second container; and
raising the temperature of the second container to 1500° C. for 6 hours.

24. The method of claim 22, wherein the step of heating comprises raising the temperature of the first container to 1000 to 1600° C. for 2 to 10 hours.

25. A method of using a phosphor, comprising:
converting the solid phosphor body made by the process of claim 11 to a phosphor powder; and
placing the phosphor powder into an illumination system.

26. The method of claim 25, wherein the step of converting comprises at least one of dry milling, wet milling, jet milling or crushing.

27. The method of claim 25, wherein the step of placing the phosphor powder into the illumination system comprises placing the phosphor powder into a white light illumination system containing a light emitting diode, into a plasma display or into a fluorescent lamp.

28. The method of claim 27, wherein the step of placing the phosphor powder into a white light illumination system comprises:
a) coating a suspension of the phosphor powder and a solvent over a surface of the light emitting diode and drying the suspension;
b) interspersing the phosphor powder in an encapsulating material overlying the light emitting diode; or
c) coating a suspension of the phosphor powder and a solvent onto a shell enclosing the light emitting diode and drying the suspension.

29. The method of claim 27, wherein the step of placing the phosphor powder into a plasma display or into a fluorescent lamp comprises:
coating a suspension of the phosphor powder and a solvent onto a surface of a lamp cover or onto a surface of a portion of a plasma display; and
drying the suspension.

30. The method of claim 10, wherein: the step of combining comprises:

a) combining a $Y_2O_3$ powder, a $CeO_2$ powder and an $Al_2O_3$ powder with $AlF_3$ to form a first mixture; or b) dissolving Y and Ce in an acid, co-precipitating a first powder comprising Y, Ce and oxygen, and combining the first powder with an $Al_2O_3$ powder and an $AlF_3$ powder to form a first mixture; or c) combining yttrium, cerium and aluminum containing compounds selected from at least one of oxide, oxalate, hydroxide, carbonate and nitrate compounds with $AlF_3$ to form a first mixture;

the step of heating comprises:

a) placing the first mixture into a crucible;

b) raising the temperature of the crucible to 1000 to 1600° C. for 2 to 10 hours; and c) supplying a reducing atmosphere comprising at least one of carbon monoxide and carbon dioxide into the crucible by evaporating activated charcoal to form a solid phosphor body comprising $(Y_{1-x-z}Ce_xGd_z)_3Al_5(O,F)_{12}$, wherein $0.1>x>0$ and $0.7>z\geq 0$; and further comprising converting the solid phosphor body into a phosphor powder.

31. The method of claim 30, wherein the step of combining comprises: combining a $Y_2O_3$ powder, a $CeO_2$ powder and an $Al_2O_3$ powder with $AlF_3$ to form a first mixture.

32. A phosphor powder made by the process of claim 11.

33. An illumination system comprising a fluorescent lamp, a plasma display or a light emitting diode and the phosphor powder of claim 32.

34. A method of making a YAG:$Ce^{3+}$ phosphor, comprising:

combining at least one powder comprising yttrium, cerium, aluminum and oxygen with $AlF_3$ to obtain a first mixture; and sintering the first mixture in a reducing atmosphere comprising carbon to form a solid YAG:$Ce^{3+}$ phosphor body.

35. The method of claim 34, wherein the reducing atmosphere does not contain forming gas.

36. The method of claim 34, wherein the step of sintering comprises:

placing the first mixture into a first container; and evaporating a carbon based fuel to obtain the reducing atmosphere comprising at least one of carbon monoxide and carbon dioxide.

37. The method of claim 36, further comprising:

placing the carbon based fuel into a second container, wherein the carbon based fuel comprises activated charcoal;

placing the first container comprising a covered alumina crucible into the second container; and raising the temperature of the second container to 1500° C. for 6 hours.

38. The method of claim 36, wherein the step of sintering comprises raising the temperature of the first container to 1000 to 1600° C. for 2 to 10 hours.

39. The method of claim 34, wherein the YAG:$Ce^{3+}$ phosphor comprises:

$$A_3D_5E_{12}:Ce^{3+},$$

wherein

A comprises at least one of Y, Gd, Lu, Sm and La;

D comprises at least one of Al, Ga, Sc and In;

E comprises oxygen;

Y, Al and oxygen comprise a crystal lattice of the phosphor; and wherein the phosphor luminosity is greater than 435 lumens per watt.

40. The method of claim 39, wherein:

the phosphor luminosity is 435 to 453 lumens per watt;

the phosphor x color coordinate ranges from 0.435 to 0.446; and the phosphor y color coordinate ranges from 0.537 to 0.545.

41. The method of claim 39, wherein the step of combining comprises:

combining a $Y_2O_3$ powder, a $CeO_2$ powder and an $Al_2O_3$ powder with $AlF_3$ to form the first mixture.

42. A method of making a phosphor comprising: combining at least one powder comprising yttrium, cerium, aluminum and oxygen with $AlF_3$ to obtain a first mixture, wherein the step of combining comprises:

a) combining a $Y_2O_3$ powder, a $CeO_2$ powder and an $Al_2O_3$ powder with $AlF_3$ to form a first mixture; or b) dissolving Y and Ce in an acid, co-precipitating a first powder comprising Y, Ce and oxygen, and combining the first powder with an $Al_2O_3$ powder and an $AlF_3$ powder to form a first mixture; or c) combining yttrium, cerium and aluminum containing compounds selected from at least one of oxide, oxalate, hydroxide, carbonate and nitrate compounds with $AlF_3$ to form a first mixture;

heating the first mixture to form a solid phosphor body, wherein the step of heating comprises:

a) placing the first mixture into a crucible;

b) raising the temperature of the crucible to 1000 to 1600° C. for 2 to 10 hours; and c) supplying a reducing atmosphere comprising at least one of carbon monoxide and carbon dioxide into the crucible by evaporating activated charcoal to form a solid phosphor body comprising $(Y_{1-x-z}Ce_xGd_z)_3Al_5(O,F)_{12}$, wherein $0.1>x>0$ and $0.7>z\geq 0$; and further comprising converting the solid phosphor body into a phosphor powder.

43. The method of claim 42, wherein the step of combining comprises:

combining a $Y_2O_3$ powder, a $CeO_2$ podwer and an $Al_2O_3$ powder with $AlF_3$ to form the first mixture.

* * * * *